(12) United States Patent
Branson et al.

(10) Patent No.: US 10,338,906 B2
(45) Date of Patent: Jul. 2, 2019

(54) CONTROLLING FEATURE RELEASE USING GATES

(71) Applicant: Facebook, Inc., Menlo Park, CA (US)

(72) Inventors: Richard William Branson, San Francisco, CA (US); Chenyang Wu, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 132 days.

(21) Appl. No.: 14/869,633

(22) Filed: Sep. 29, 2015

(65) Prior Publication Data
US 2017/0090898 A1    Mar. 30, 2017

(51) Int. Cl.
G06F 8/60     (2018.01)
G06F 8/65     (2018.01)
G06F 8/34     (2018.01)
H04L 29/08    (2006.01)

(52) U.S. Cl.
CPC .............. G06F 8/65 (2013.01); G06F 8/34 (2013.01); G06F 8/60 (2013.01); H04L 67/34 (2013.01)

(58) Field of Classification Search
None
See application file for complete search history.

(56) References Cited

U.S. PATENT DOCUMENTS

| | | | | |
|---|---|---|---|---|
| 9,817,649 | B2* | 11/2017 | D'Amico | G06F 8/61 |
| 10,067,863 | B1* | 9/2018 | Gandhi | G06F 11/3672 |
| 2003/0126590 | A1* | 7/2003 | Burrows | G06F 9/30192 |
| | | | | 717/154 |
| 2007/0294319 | A1* | 12/2007 | Mankad | G06F 11/1662 |
| 2008/0127053 | A1* | 5/2008 | Stubbs | G06F 8/38 |
| | | | | 717/106 |
| 2010/0023560 | A1* | 1/2010 | Erb | G06F 16/2343 |
| | | | | 707/E17.01 |
| 2010/0268581 | A1* | 10/2010 | Biancardini | G06F 8/60 |
| | | | | 705/14.4 |
| 2014/0080467 | A1* | 3/2014 | Urbanek | H04W 8/20 |
| | | | | 455/418 |
| 2014/0208088 | A1* | 7/2014 | Somani | G06F 9/44505 |
| | | | | 713/1 |
| 2016/0291955 | A1* | 10/2016 | Axtell | G06F 8/65 |
| 2017/0019858 | A1* | 1/2017 | Zhao | H04W 52/0258 |
| 2018/0217829 | A1* | 8/2018 | Mowatt | G06F 8/65 |

* cited by examiner

Primary Examiner — Wei Y Zhen
Assistant Examiner — Binh Luu
(74) Attorney, Agent, or Firm — FisherBroyles, LLP (57) ABSTRACT

The disclosure is directed to controlling availability of a feature of an application without having to change a code of the application. A gate application employs a "gate" that facilitates making a feature available to a set of users without having to change the code of the application as the set of users to whom the feature is to be made available change. The gate includes parameters and criteria that can determine whether a particular feature of the application, e.g., a photo tagging feature of a social networking application, is to be made available to a particular user. If the request attributes, e.g., attributes associated with a requesting user, satisfy the criteria defined in the gate, the gate indicates to the host application to make the feature available, which then executes a portion of the code corresponding to the particular feature to make the particular feature available to the user.

20 Claims, 8 Drawing Sheets

FIG. 1

| Parameter | Type | Values |
|---|---|---|
| $whitelist | User → | User 1; User 2; User 3; |
| $no_access_country | Country → | Country 1; Country 3; |
| $no_device_OS | Operating system → | OS 2; |

Criterion:
(request.user in $whitelist) OR (
request.user.is_staff OR (
(NOT (requeset.country in $no_access_country)) AND (NOT (request.device.OS in $no-device_OS))
)
)

CONTROLLING FEATURE RELEASE USING GATES

BACKGROUND

Software applications, e.g., a social networking application, typically release new features to users of the application in a phased manner. For example, the application releases a feature to a subset of the users in a first phase, to another subset of users in a second phase and so on. The number of users to whom the features are made available is increased gradually over a period of time. The application providers can adopt such a phased manner of releasing the features for various purposes. Generally, many server computing devices ("servers") can provide application services, and users are associated with one or more of the servers. For example, the load on a servers executing the application can be significantly high if all of the users associated with that server access the new feature at around the same time, thereby degrading the user experience. The load on the server can be managed efficiently when the feature is made available to the users in a phased manner. In another example, if the new feature has any errors or efficiency issues, the server can be overwhelmed with a number of error messages, making it difficult for the application provider to analyze and rectify the errors. If the feature is released in a phased manner, the application provider can monitor the performance of the application for a smaller number of users, analyze and rectify any uncovered errors in the feature, and then proceed with releasing the feature in the next phase to other set of users.

To accomplish this phased manner of releasing the features, the code with new features is typically deployed iteratively to a few servers at a time. However, the process of deploying the code iteratively can be complicated, inefficient and requires more effort. Further, at any particular time, different servers can have different versions of the code. For example, in order to make the new feature available only to a first subset of the users, a first version of the application that has the new feature may have to be deployed on the server which serves the first subset of the users, and the other servers, which serve users other than the first subset, would have a second version of the application that does not have the new feature. When the new feature is to be made available to a second subset of the users, either the first version of the application is deployed on a second server that serves the second subset of users, or the second version of the application executing on the second server is changed to include the new feature, which requires the code of the application on the second server to be changed and redeployed on the second server.

If the criteria for making the feature available changes, e.g., the set of users to whom the feature is to be made available, changes, the code of the application has to be changed to include the new criteria, compiled and redeployed to the servers. Deploying the application multiple times or changing the code multiple times as and when the features are to be made available to a different set of users can be inefficient, incur significant amount of effort, and increase costs. Having different versions of the application executing on different servers can also give rise to consistency problems. Further, if different features are to be made available to different users, the number of versions of the application that can exist can be significantly high, which can amplify the version management problems.

BRIEF DESCRIPTION OF THE DRAWINGS

FIG. 2 shows an example graphical user interface (GUI) for defining a gate.

DETAILED DESCRIPTION

Embodiments are disclosed for controlling availability of a feature of an application executing on many server computing devices ("servers") to users without having to change code for the application. The embodiments employ a gate application that can facilitate releasing of a feature (e.g., making a feature available or accessible) to a target set of users without having to change the code of the application (and recompile and/or redeploy), as the target set of users change. The gate application can have a "gate," which includes one or more parameters and one or more criteria that can determine whether a particular feature of a host application, e.g., a photo tagging feature in a social networking application, is to be made available to a particular user. When a user accesses the social networking application, the social networking application can request the gate to determine whether the particular feature is to be made available to the user. The gate can extract one or more attributes from the request, e.g., attributes associated with the user such as user ID, country from which the request is originating, and determine whether the attributes satisfy the criteria defined in the gate. If the gate determines that the attributes in the request satisfy the criteria, the gate indicates to the social networking application to make the feature available to the user. The social networking application can then execute a portion of the code in the social networking application corresponding to the particular feature and make the particular feature available to the user. If the gate determines that the attributes in the request do not satisfy the criteria, the gate indicates to the social networking application to make the feature not available to the user, and therefore, the social networking application may not execute the portion of the code corresponding to the particular feature.

The parameters in the gate can be parameters associated with the host application, a user of the host application, etc. For example, a parameter can be a user identification (ID) information of the user; a type of the user, e.g., a member of the social networking application, an advertiser on the social networking application, an employee of an organization developing the social networking application; a whitelisted user—user who may be permitted to access a feature, a blacklisted user—user who may not be permitted to access the feature; a country where the feature is made available or unavailable; an operating system of a client computing device ("client") used to access the host application, a type of the client, e.g., a mobile or non-mobile device. The criteria can be defined based on a set of parameters and parameter values, which can be changed anytime to change how or to whom the features are made available, without redeploying the code of the host application. For example, if a particular feature is to be released only to users in a "country A," a feature manager of the particular feature, e.g., any entity who determines which users the particular feature is to be made available to, may just have to generate a gate for the particular feature, or edit an existing one, add an "allowed country" parameter, specify the parameter value "country A", define a criterion to allow the users in "country A" and save the gate. The feature would be made available to the users in that country automatically without having to recompile and/or redeploy the code of the host application. The host application requests the gate, e.g., when a particular user accesses the host application, to determine if the particular user is from "country A." The gate can extract the "user.country" attribute from the request, which indicates a country the user is accessing the host application from, determine if the "user.country" attribute satisfies the criteria and make the particular feature available to the particular user if the particular user is from "country A." The host application can execute a portion of the code corresponding to the particular feature upon the gate indicating to host application to make the particular feature available to the particular user.

If the particular feature is to be made available to the users in "country B" as well, e.g., at a later time, the feature manager may modify the gate by adding the parameter value "country B" to the "allowed country" parameter, and the particular feature would be made available to the users in "country B" automatically without having to change the code of the host application.

Because the code of the host application is not changed when the gate changes, e.g., criteria for making the feature available changes, there may be no need to recompile and/or redeploy the code, thereby saving a significant amount of effort and computing resources. In some embodiments, regardless of what features are to be made available to which users, a single version of the host application, e.g., a version of the host application having an entire set of features, can be deployed at each of the one or more server computing devices ("servers") serving different users. The gate application can control the availability of the features by using gates, e.g., as described above, which can eliminate the need to deploy different versions of the host application at different servers in which a particular version of the host application having a particular set of features is deployed at a particular server which serves a particular set of users to whom the particular set of features are to be made available.

The gate application provides a graphical user interface (GUI) for creating a gate. The GUI allows feature managers of varied experiences and skill levels to define the gates. In some embodiments, the GUI facilitates feature managers with minimum to none software programming experience to define a gate, at least in portion, conveniently. For example, the GUI presents a list of parameter types from which the particular type can be selected and a parameter of the selected parameter type can be added. The parameter values for the parameter can also be added conveniently. The criterion for determining whether a particular feature is to be made available can also be defined conveniently. In some embodiments, the criterion can be defined using a Boolean expression of the parameters. For example, a criterion for allowing the users in a specified country to access a particular feature can be defined as "(request.country in $allow_country)," in which "$allow_country" is a parameter that includes the list of countries (parameter values) the users from which can be provided access to the particular feature, and "request.country" is an attribute of the request that identifies a country from which the user is accessing the application. If the criterion yields a "true" value, that is, the user request is from the list of countries specified in "$allow_country", the gate returns a true value to the host application indicating the host application to make the feature available to the user. If the criterion yields a "false" value, that is, the user request is not from the list of countries specified in "$allow_country", the gate returns a false value to the host application indicating the host application to restrict the user from accessing the feature.

Different portions of a gate can be coded by different entities. In some embodiments, the parameters are defined by a developer having software programming expertise and the criterion is coded by the developer. The parameter values for the parameters may be defined by the developer and/or feature manager. However, in some embodiments, the feature manager can code any of the parameters, parameter values and the criterion of the gate. In some embodiments, different features are controlled using different gates.

The gate application can also provide type checking feature, e.g., to minimize errors that can be introduced when a parameter value added to a parameter are of incompatible data types. For example, if a user ID is added as a parameter value of a parameter type of "country," it can cause an error. In another example, if two incompatible entities are compared in the criterion, e.g., a user ID type parameter is compared with a country type parameter, it can cause an error. The gate application checks the data type of the entities, e.g., parameters, parameter values and/or request attributes used in the gate and notifies any error in the data types, e.g., mismatch in data types, to the developer and/or the feature owner. The developer and/or the feature owner can rectify the error and save the gate.

Figure 1:
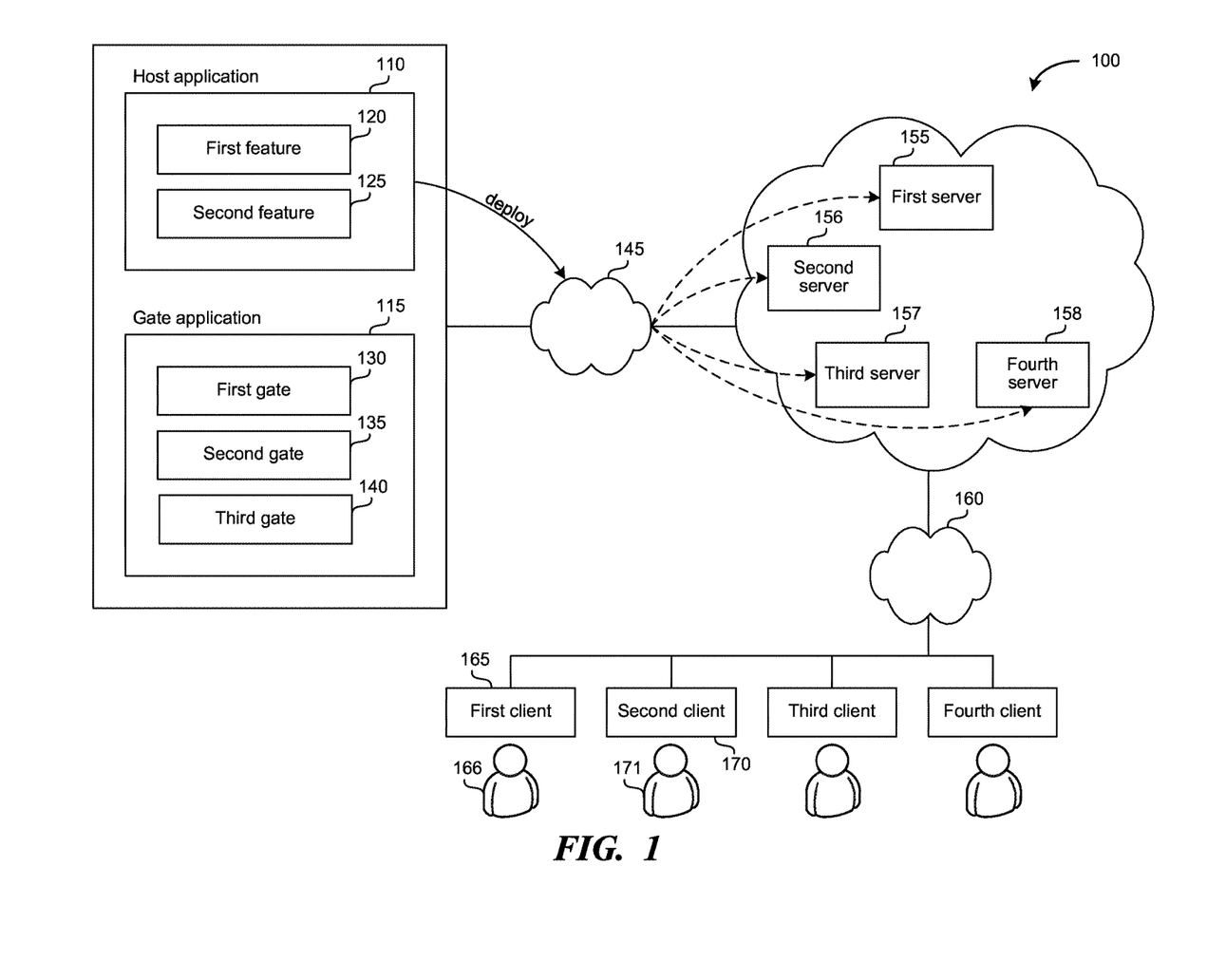
FIG. 1 is a block diagram of an environment in which the disclosed embodiments can be implemented.

Turning now to the figures, FIG. 1 is a block diagram of an environment 100 in which the disclosed embodiments can be implemented. The environment 100 includes a server 105 using which a host application 110 that has one or more features, e.g., a first feature 120 and a second feature 125, can be developed, e.g., by a developer. In some embodiments, the host application 110 is a social networking application and a feature can be any of multiple features of the social networking application. For example, a feature can include a photo upload feature that facilitates a user, e.g., a first user 166, of the social networking application to share pictures with one or more of other users, a second user 171, of the social networking application, a photo tagging feature that facilitates the user to tag other users in a picture, a messaging feature that facilitates the user to message one or more of the other users, etc.

The host application 110 can be deployed, e.g., transmitted for execution, to one or more servers, e.g., a first server 155, a second server 156, a third server 157, and a fourth server 158, in a distributed computing system 150. The host application 110 can be deployed to multiple servers for various reasons, e.g., to balance a load on the servers, for disaster recovery purposes—user requests can be diverted to a stand-by server if a primary server fails, for serving users in a particular geographical location. For example, the first server 155 can serve requests originating from users located in a first geographical location and the second server 156 can serve requests originating from users located in a second geographical location. The host application 110 can be deployed to the servers in the distributed computing system using a first communication network 145, e.g., local area network (LAN), a wide area network (WAN) or Internet. In some embodiments, the host application 110 is redeployed to the servers in the distributed computing system 150 as when a source code ("code") of the host application 110 is changed. The changed code can be recompiled to generate an executable code that can be executed by the servers and the executable code can be transmitted to the servers.

The host application 110 can be implemented in various formats. For example, the host application 110 can be implemented as a desktop app, a mobile app, or as a browser-based application, e.g., a webpage. A user, e.g., the first user 166, can access the host application 110 using a client, e.g., a first client 165. The client can be any computing device that is capable of accessing the host application 110, e.g., a smartphone, a tablet PC, desktop, a laptop, a wearable device. The clients access the host application 110 executing on the servers in the distributed computing system 150 via a second communication network 160, e.g., LAN, WAN, Internet. The client accesses the host application 110 by accessing one of the servers in the distributed computing system 150. The host application 110 on the server 105 may not be accessible by the users of the host application 110, as the server 105 is used for development purposes of the host application 110.

The features of the host application 110 can be made available to some users of the host application 110 and unavailable to other users for various reasons. For example, the first feature 120 can be made available to a first subset of the users initially, and then to a second subset of the users at a later stage, e.g., after making any necessary changes to the code to overcome any uncovered errors or performance issues faced by the first subset of users. That is, the feature is made available to the users in a progressive manner. In order to facilitate such a progressive release of the feature, different versions of the host application 110 may have to be deployed at different servers. For example, in order to make the first feature 120 available only to the first subset of the users, a first version of the host application 110 that has the first feature 120 may have to be deployed on the first server 155 which serves the first subset of the users, and a second version of the host application that does not have the first feature 120 may have to be deployed on the other servers. When the first feature 120 is to be made available to the second subset of the users, the second version of the application may have to be changed to include the first feature 120 which requires the code of the host application 110 on the corresponding server to be changed and redeployed on the corresponding server.

In some embodiments, the host application 110 may have to make the first feature 120 available only to a particular set of users. If the set of users change, the code of the host application may have to be changed to make the feature available to the changed set of users.

A gate application 115 facilitates controlling the release of features of the host application 110 to a target set of users without having to change the code the host application 110, thereby eliminating the need to deploy different versions of the host application 110 on different servers for controlling the release of features. The gate application 115 uses a gate, e.g., a first gate 130, a second gate 135 and a third gate 140, which determines whether a particular feature is to be made available to a particular user. In some embodiments, different gates are implemented for controlling different features. A gate can include one or more parameters and one or more criteria defined using the one or more parameters which determine whether a particular feature is to be made available to a particular user. When a user, e.g., the first user 166, accesses the host application 110, the host application 110 can request a gate, e.g., the first gate 130, to determine whether the first feature 120 is to be made available to the first user 166. The first gate 130 determines whether one or more attributes of a request, e.g., originating from the first user 166 accessing the host application 110, satisfy the criteria of the first gate 130. If the attributes satisfy the criteria of the first gate 130, the first gate 130 indicates to the host application 110 to make the first feature 120 available to the first user 166. If the first gate 130 determines that the attributes in the request do not satisfy the criteria, the first gate 130 indicates to the host application 110 to restrict the first user 166 from accessing the first feature 120.

The gate application 115 provides a GUI for creating a gate, e.g., the first gate 130. A developer and/or a feature manager can define the parameters, parameter values and the criteria of the first gate 130 using the GUI. After the first gate 130 is defined, the first gate 130 is transmitted to one or more servers in the distributed computing system 150 for use by the host application 110. In some embodiments, the gates are transmitted to each of the servers in the distributed computing system 150 at which the host application 110 is deployed. In some embodiments, the gates are deployed at a subset of the servers in the distributed computing system 150 that execute the host application 110. In some embodiments, the gates are deployed to a set of servers that are specifically configured to execute the gates.

By having the gates control the availability of features of the host application, the need to deploy different versions of the host application 110 on different servers for controlling the release of features is eliminated. For example, a single version of the host application 110, e.g., having all the features, can be deployed at all the servers and the feature availability can be controlled using the gates. Whenever the criteria for making a particular feature to be available is to be changed, the gate for the corresponding feature can be modified, e.g., the criteria can be changed, and the modified gate can be deployed to the servers in the distributed computing system 150. The host application 110 can use the modified gate to determine whether or not to make the particular feature available to a particular user. This way, the code of the host application 110 may not have to be changed when the criteria for determining whether to make the particular feature available to a particular user changes.

FIG. 2 shows an example GUI 200 for defining a gate. In some embodiments, the GUI 200 can be implemented by the gate application 115 of FIG. 1. The GUI 200 can be used to manage a gate, e.g., the first gate 130. The GUI 200 lists a parameter, e.g., a first parameter 205, and one or more parameter values, e.g., a first set of parameter values 215, for the parameter that are used by criteria 220 to determine whether to make the first feature 120 available to a user. The parameters of the gate can be of a particular data type. For example, the first parameter "$whitelist" 205 is of "user" data type 210. That is, the parameter values that can be added to the first parameter 205 should be of "user" data type, e.g., user IDs. Examples of parameter data types can include operating system type, version of the host application 110, country, percentage, and number of followers. Further, the first parameter 205 can be configured to have a single parameter value or multiple parameter values.

The criterion 220, which determines whether the first feature 120 is to be made available to the user, can be defined using the parameters and attributes of a request, e.g., the request originating from a user when the user accesses the host application. In the criterion 220, the attributes of the request used are "request.user" which indicates user information, e.g., user ID, of the user from whom the request for accessing the host application 110 is originating, "request.country" which identifies a country from which the request is originating, "request.device.OS" which identifies an operating system of the device from which the request is originating. The request can have such multiple attributes. In some embodiments, the first gate 130 receives the request from the host application 110, e.g., when the user accesses the host application 100, as a request data object, which can include the above attributes.

In some embodiments, the criterion 220 can be defined as a Boolean expression using the parameters and the attributes. The Boolean expression returns a true or false value, which in turn indicates whether the first feature 120 is to be made available to the particular user or not. For example, the criterion 220 indicates that the first feature 120 is to be made available to a user if:

the user from who the request is originating is one of the users specified in the "$whitelist" parameter, or the user is a staff, e.g., a developer or an employee of the organization developing the host application 110, or the country from which the request of the user is originating is not one of the countries specified in "$no_access_country" parameter and the operating system of the device of the user from which the request is originating is not one of the operating systems specified in the "$no_device_OS" parameter.

If the criterion 220 is satisfied for the user, the first gate 130 can return a true value to the host application 110 indicating the host application 110 to make the first feature 120 available to the user. If the criterion is not satisfied for the user, the first gate 130 can return a false value to the host application 110 indicating the host application 110 to restrict the user from accessing the feature.

The criteria for determining whether the first feature 120 is to be made available to the user can include many such parameters. Further, if, at any point in time, a feature owner determines that the criteria for determining whether the first feature 120 is to be made available to a particular user has to change, the criterion 220 and/or the parameters and parameter values can be modified to reflect the new criteria. For example, if the feature manager determines that the first feature 120 is to be made available to only "50%" of the users of the host application 110, the first gate 130 can be modified to add a parameter, e.g., "$percentage_allow" of percentage data type and specify a parameter value of "50%" and the criterion 220 be changed include "request.user in $percentage_allow," which specifies that the first feature 120 is to be made available if the user is within "50%" of the users to whom the first feature 120 is to be made available.

The criterion 220 shows a pseudocode of the Boolean expression. The actual syntax of the criterion 220 may be different from what is illustrated in FIG. 2. Further, the criterion 220 can also be defined using expressions other than Boolean expressions.

Different portions of the first gate 130 can be coded by different entities. In some embodiments, while a developer having software programming expertise can code any of the parameters, parameter values, or the criterion, the feature owner, who typically has minimum to none software programming expertise, may input only the parameter values. If the criterion 220 is not editable by the feature owner, the GUI 200 may present the criterion 220 as read-only when the first gate 130 is accessed by the feature owner. However, in some embodiments, the feature manager can code any of the parameters, parameter values and the criterion 220 of the first gate 130. Further, though the developer may code the parameters, parameter values and the criterion, the developer may do so based on the feedback provided by the feature owner, e.g., feedback regarding the criteria for who the features should be made available.

The gate application 115 can also provide type checking feature, which determines any errors that can be introduced when a parameter value added to a parameter is of incompatible data type. For example, if a user ID is added as a parameter value to a parameter of data type "country," the gate application 115 generates an error, thereby preventing from deploying gates with type errors. In another example, if two incompatible entities are compared in the criterion 220, e.g., a parameter of user ID data type is compared with a parameter of country data type, the gate application 115 generates an error. The gate application 115 checks the data type of the entities, e.g., parameters, parameter values and/or request attributes used in the first gate 130 and notifies any error in the data types, e.g., mismatch in data types, to the developer and/or the feature owner. The developer and/or the feature owner can rectify the error before the first gate 130 is deployed to the servers in the distributed computing system 150.

Figure 3A:
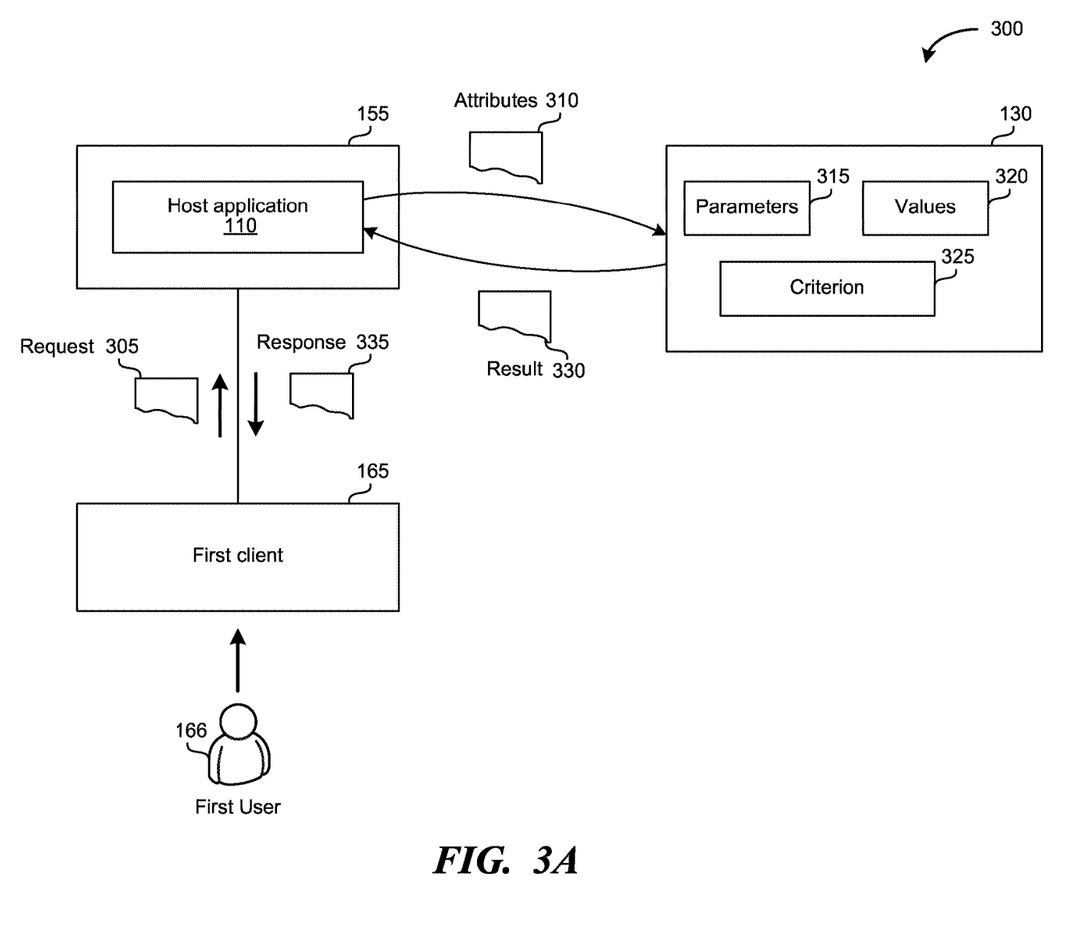
FIG. 3A is a bock diagram of an example for controlling availability of a feature of a host application using a gate, consistent with various embodiments.

FIG. 3A is a bock diagram of an example 300 for controlling availability of a feature of a host application using a gate, consistent with various embodiments. In some embodiments, the example 300 can be implemented in the environment 100 of FIG. 1. A user, e.g., the first user 166 can access the host application 110 executing at the first server 155. The first user 166 can access the host application 110 using the first client 165. The first client 165 sends a request object 305, which indicates a request to access the host application 110, to the first server 155. Upon receiving the request object 305 from the first client 165, the host application 110 invokes the first gate 130 to determine if one or more features of the host application 110, e.g., the first feature 120 is to be made available to the first user 166. The first gate 130 extracts attributes 310 from the request object 305. In some embodiments, the attributes 310 include information associated with the first user 166, e.g., user ID of the first user 166, country from which the request is originating. The first gate 130 determines if the attributes 310 satisfy the criterion 325 of the first gate 130. If the criterion 325 is satisfied, the first gate 130 indicates to the host application 110 to make the first feature 120 available to the first user 166. If the criterion 325 is not satisfied, the first gate 130 indicates to the host application 110 to make the first feature 120 unavailable to the first user 166. The first gate 130 sends the indication to the host application 110 via result 330. In some embodiments, the result 330 can include a true or false value. The result 330 can include a true value if the criterion 325 is satisfied and a false value if the criterion 325 is not satisfied.

The host application 110 sends a response 335 to the first client 165 based on the result 330. If the result 330 includes a true value, the response 335 includes the first feature 120. If the result 330 includes a false value, the response 335 does not include the first feature 120. In some embodiments, the host application 110 makes the first feature 120 available by executing a portion of the code corresponding to the first feature 120, e.g., as described in FIG. 3B.

Figure 3B:
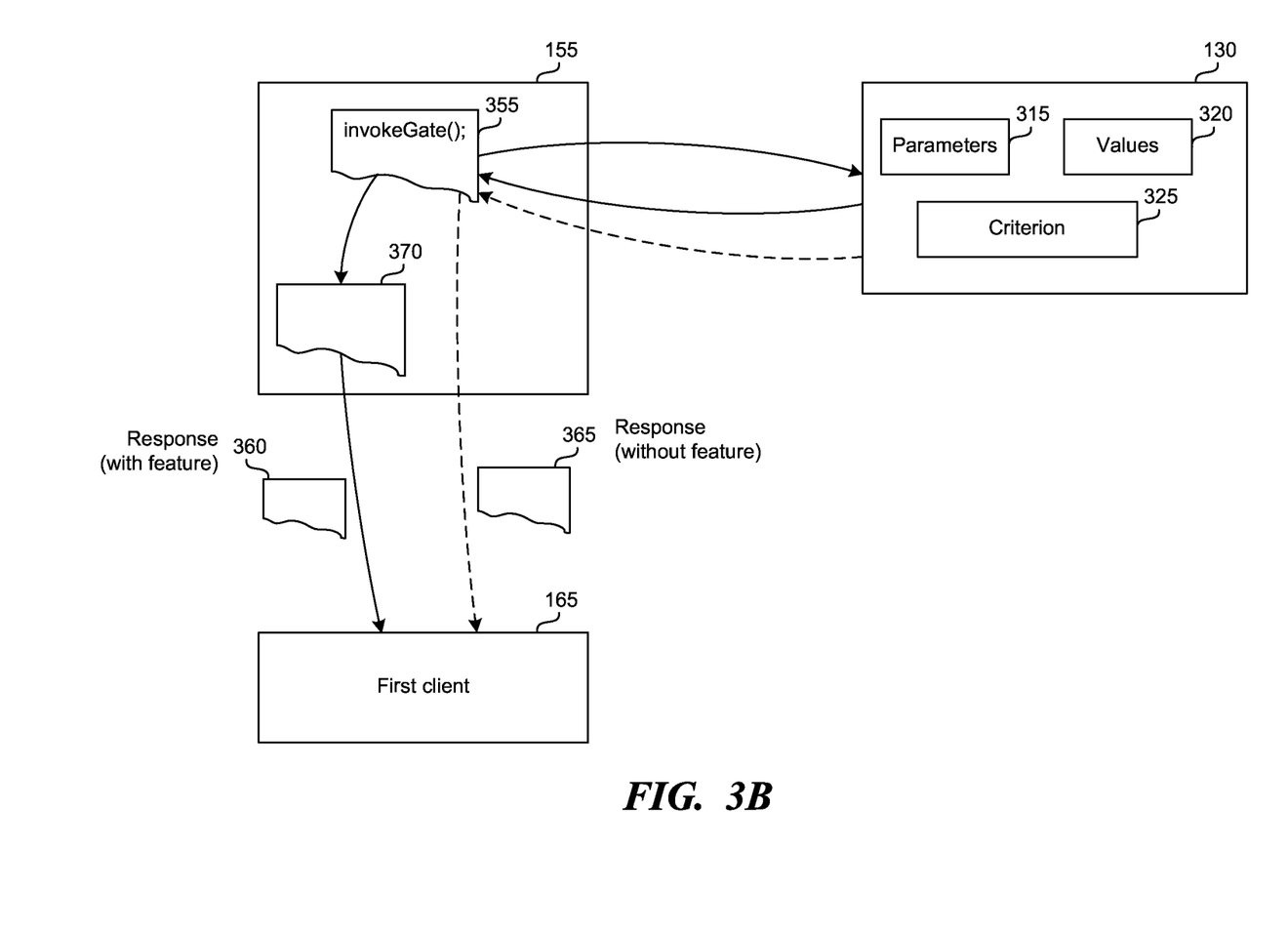
FIG. 3B is another block diagram illustrating controlling the availability of a feature of a host application, consistent with various embodiments.

FIG. 3B is another block diagram illustrating controlling the availability of a feature of a host application, consistent with various embodiments. When the first client 165 accesses the host application 110, the host application 110 executes a first portion 355 of the code of the host application 110 to invoke the first gate 130. The first gate 130 determines whether the first feature 120 is to be made available based on the criterion 325 as described above and sends the result 330 of the determination to the host application 110. If the result 330 includes a true value, the host application 110 executes a second portion 370 of the code of the host application 110 corresponding to the first feature 120 and sends a response 360 including the first feature 120 to the first client 165. If the result 330 includes a false value, the host application 110 does not execute the second portion 370 of the code of the host application 110 thereby making the first feature 120 unavailable to the first user 166. The host application 110 sends a response 365, which does not include the first feature 120, to the first client 165.

When the criterion for making the first feature 120 to the users of the host application 110 is to be changed, in some embodiments, a code of the first gate 130 is changed but not the code of the host application 110. The host application 110 just includes the first portion 355 of the code to invoke the first gate 130. Accordingly, the code of the host application 110 does not change when the parameters 315, parameter values 320 and/or the criterion 325 of the first gate 130 changes. The host application 110 can continue to invoke the first gate 130 and the first gate 130 makes the determination based on the changed criteria.

In some embodiments, the parameters 315, the parameter values 320 and the criterion 325 are similar to the parameters, parameter values and the criterion 220 described at least with reference to the GUI 200 of FIG. 2.

Figure 4:
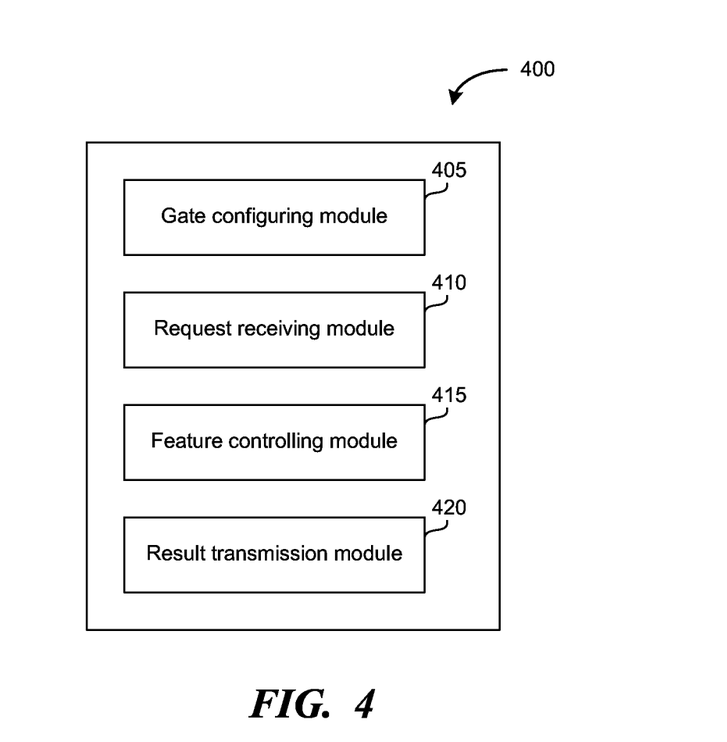
FIG. 4 is a block diagram of a system for controlling the availability of a feature of a host application using a gate application, consistent with various embodiments.

FIG. 4 is a block diagram of a system 400 for controlling the availability of a feature of a host application using a gate application, consistent with various embodiments. The system 400 can be implemented in the environment 100 of FIG. 1. The system 400 includes a gate configuring module 405 that is used for defining a gate, e.g., the first gate 130, for controlling a particular feature, e.g., the first feature 120, of a host application 110. The gate configuring module 405 can define the gate as described at least with reference to FIGS. 1 and 2. In some embodiments, the gate configuring module 405 can provide the GUI 200 of FIG. 2 for defining the gate. The gate configuring module 405 can define different gates for controlling different features of the host application 110.

The system 400 includes a request receiving module 410 to receive a request from a host application 110 to determine whether to make a particular feature of the host application 110 available to a particular user of the host application 110. The request receiving module 410 can also extract the attributes of the request, e.g., as described at least with reference to FIGS. 3A and 3B.

The system 400 includes a feature controlling module 415 that determines whether the attributes of the request satisfy a criterion of the gate and generates a result of the determination accordingly, e.g., as described at least with reference to FIGS. 3A and 3B. The system 400 includes a feature controlling module 415 that determines whether the attributes of the request satisfy a criterion of the gate and generates a result of the determination accordingly. The system 400 includes a result transmission module 420 that transmits a result, e.g., result 330, of the determination made by the feature controlling module 415. In some embodiments, the result can be a Boolean value of true or false. If the feature controlling module 415 determines that the attributes of the request satisfy the criterion of the gate, the result will include a true value to indicate to the host application 110 to make the particular feature available to the particular user. If the feature controlling module 415 determines that the attributes of the request do not satisfy the criterion of the gate, the result will include a false value to indicate to the host application 110 to make the particular feature unavailable to the particular user.

Note that the result can have values of type other than Boolean values. The result can have any type of value that can indicate to the host application 110 whether or not to make the feature available to the user. The system 400 can be implemented in the server 105, in one or more of the servers 155-158, as a stand-alone computer, or as a distributed computing system in which various components of the system 400 is distributed over various entities in the environment 100. In some embodiments, a specified module of the system 400 can be implemented in more than one entity in the environment 100. In some embodiments, different portions of a specified module of the system 400 can be implemented in different entities in the environment 100.

Figure 5:
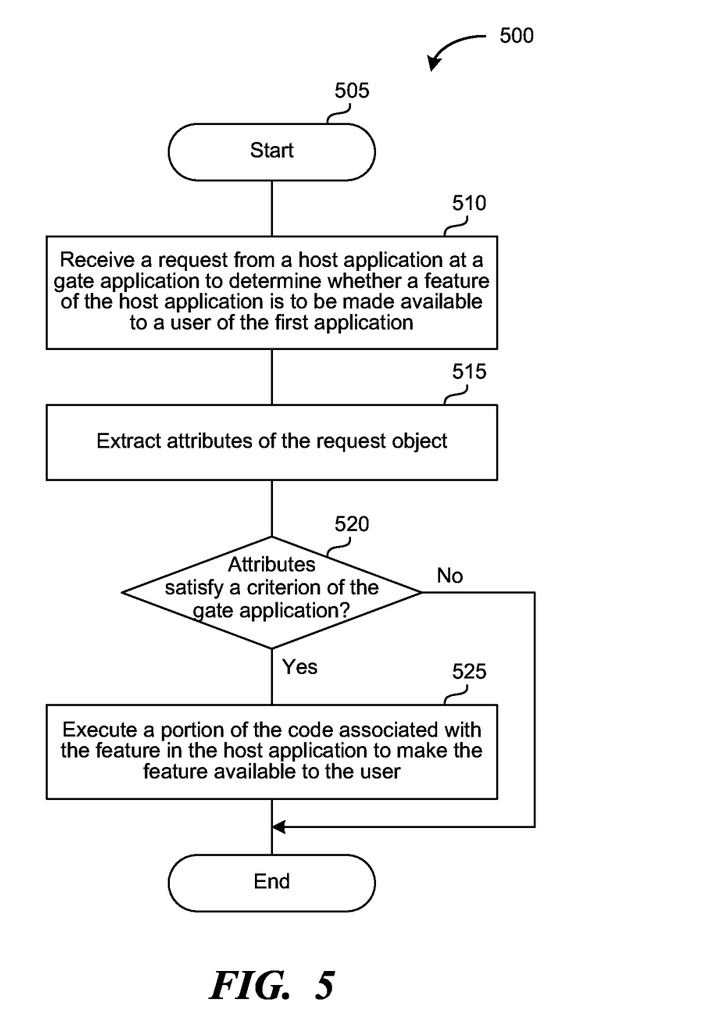
FIG. 5 is a flow diagram of a process for controlling the availability of a feature of a host application by a gate application, consistent with various embodiments.

FIG. 5 is a flow diagram of a process 500 for controlling the availability of a feature of a host application by a gate application, consistent with various embodiments. In some embodiments, the process 500 can be implemented in the environment 100 of FIG. 1. The process 500 begins at block 505, and at block 510, the request receiving module 410, receives a request, at a gate of the gate application 115, from a host application 110 for determining whether to make a particular feature available to a particular user of the host application 110. For example, the request receiving module 410, receives a request at the first gate 130 for determining whether to make the first feature 120 available to the first user 166 accessing the host application 110. In some embodiments, the host application 110 requests the first gate 130 when the first user 166 accesses the host application 110.

At block 515, the request receiving module 410, extracts the attributes, e.g., attributes 310, of the request. In some embodiments, the attributes include information associated with the first user 166, e.g., user ID, country from which the request is originating, information regarding an operating system of the first client 165 from which the request is originating.

At decision block 520, the feature controlling module 415 determines whether the attributes satisfy the criterion of the gate. For example, the feature controlling module determines whether the attributes 310 satisfy the criterion 325.

If the feature controlling module 415 determines that the attributes satisfy the criterion of the gate, at block 525, the gate indicates to the host application 110 to make the feature available to the user. For example, the first gate 130 indicates to the host application to make the first feature 120 available to the first user 166. The host application 110 executes a portion of the code, e.g., the second portion 370 of the code, corresponding to the first feature 120 to make the first feature 120 available to the first user 166.

On the other hand, if the feature controlling module 415 determines that the attributes do not satisfy the criterion of the gate, the gate indicates to the host application 110 to make the feature unavailable to the user and the process 500 returns. The host application 110 may not execute the second portion 370 of the code corresponding to the first feature 120 and therefore, makes the first feature 120 unavailable to the first user 166.

Figure 6:
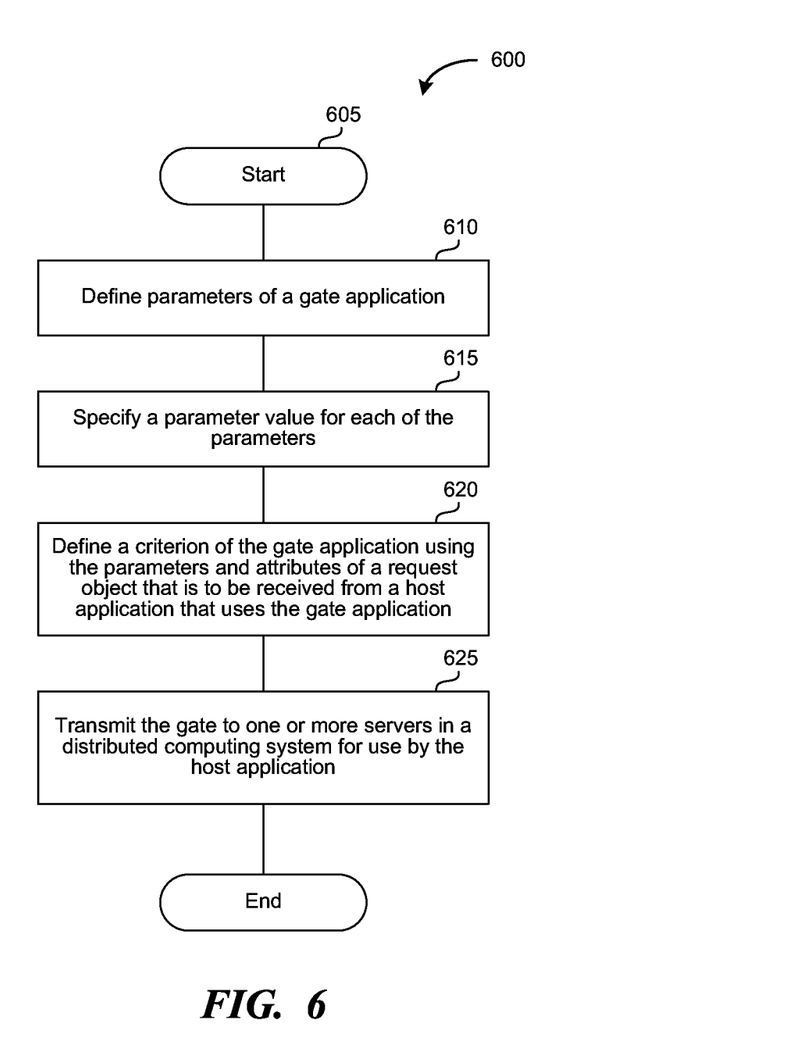
FIG. 6 is a flow diagram of a process of defining a gate for controlling a feature of a host application, consistent with various embodiments.

FIG. 6 is a flow diagram of a process 600 of defining a gate for controlling a feature of a host application, consistent with various embodiments. In some embodiments, the process 600 may be implemented in the environment 100 of FIG. 1. The process 600 can be used to define a gate, e.g., the first gate 130, which determines whether to make the first feature 120 available to a particular user, e.g., the first user 166. The process 600 begins at block 605, and at block 610, the gate configuring module 405 receives one or more parameters of the first gate 130, e.g., from a developer or a feature manager. In some embodiments, the parameters are added to the gate by the developer. The parameters of the first gate 130 can include parameters such as the first parameter 205 of FIG. 2. In some embodiments, the developer or the feature manager can use the GUI 200 to input the parameters.

At block 615, the gate configuring module 405 receives one or more parameter values for each of the one or more parameters added to the first gate 130. The parameter values can be similar to the first set of parameter values 215. In some embodiments, the parameter values can be input by the feature owners, e.g., using the GUI 200.

At block 620, the gate configuring module 405 receives a criterion for determining whether the first feature 120 is to be made available to a particular user. In some embodiments, the criterion can be similar to the criterion 220. The developer or the feature manager can input the criterion, e.g., using the GUI 200. In some embodiments, the criterion 225 is coded by the developer.

At block 625, the gate configuring module 405 transmits the first gate to one or more servers, e.g., servers 155-158 in the distributed computing system 150 for use by the host application 110. In some embodiments, the first gate 130 may be compiled to generate an executable code, which is then transmitted to the one or more servers.

Figure 7:
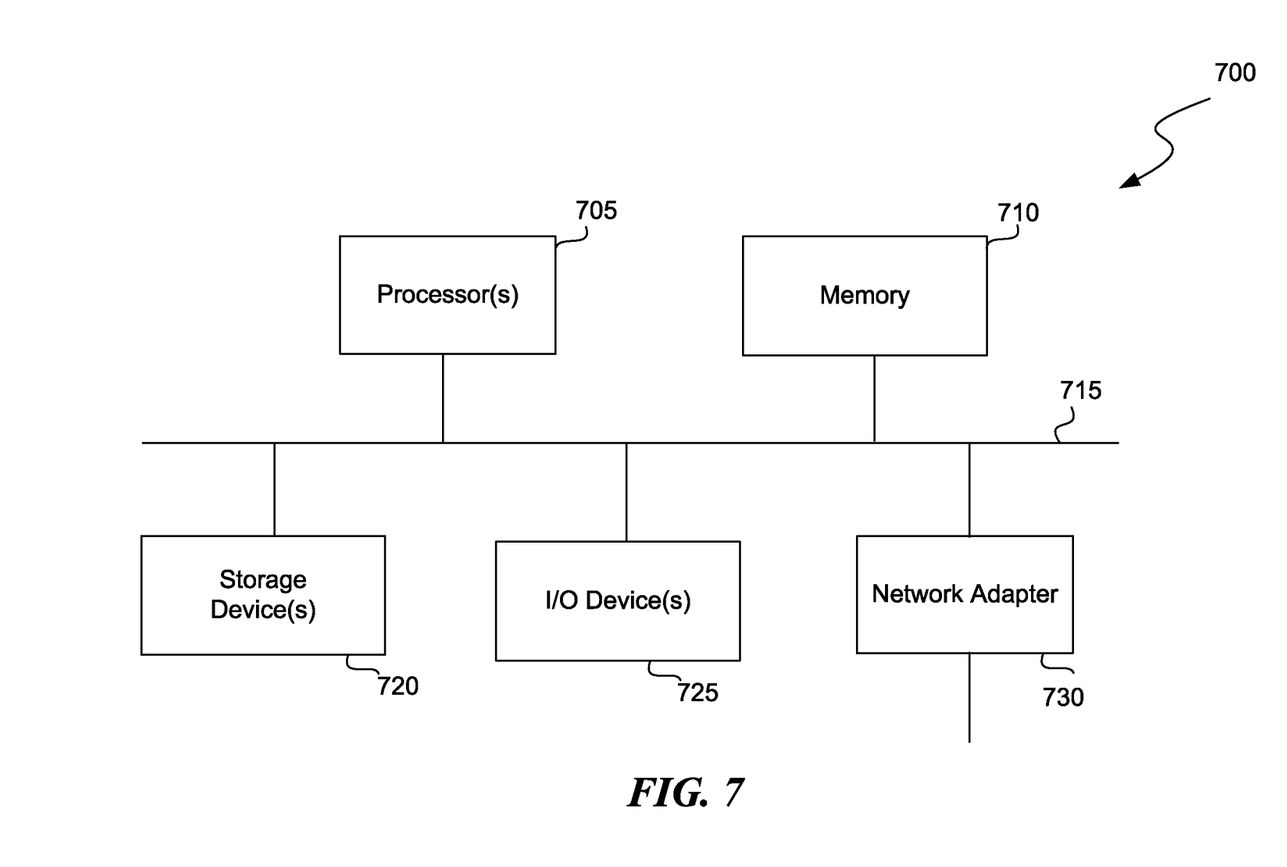
FIG. 7 is a block diagram of a processing system that can implement operations of the disclosed embodiments.

FIG. 7 is a block diagram of a computer system as may be used to implement features of the disclosed embodiments. The computing system 700 may be used to implement any of the entities, components or services depicted in the examples of the foregoing figures (and any other components and/or modules described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
   receiving, at a server computer, a request object from a client device, the request object representing a request from a user for accessing a host application executing at the server computer;
   receiving, by a gate application executing on the server computer and from the host application, the request object for determining whether to make available a feature of the host application to the user, the gate application including a plurality of different gates, each gate controlling availability of one or more specified features of the host application to the user based on a criterion defined in the gate application, the gate application implementing at least one of the plurality of gates to control the availability of a specified feature at runtime, the gate application including multiple parameters and each of the parameters being associated with a parameter value;
   obtaining, by the gate application, multiple attributes of the request object, the attributes associated with the user, each of the attributes having an attribute value;
   determining, by the gate application, whether the attributes satisfy the criterion;
   responsive to a determination that the attributes satisfy the criterion, causing execution, at the server computer, of a portion of host application code associated with the specified feature to make the feature available to the user on the server computer; and
   sending, from the server computer, a response to the client device, the response indicating availability of the feature.

2. The method of claim 1, wherein the gate application is configured to be updated at the server computer during runtime of the host application at the server computer.

3. The method of claim 1, wherein the gate application defines the criterion as a Boolean expression of the parameters and the attributes.

4. The method of claim 1, wherein determining whether the attributes satisfy the criterion includes:
   comparing the attribute values with the parameter values in determining whether the criterion is satisfied.

5. The method of claim 1, wherein the gate application is defined by:
   adding a specified parameter to the gate application as one of the parameters,
   adding a specified parameter value of the specified parameter as the parameter value, and
   defining the criterion as a Boolean expression using the parameters and the attributes.

6. The method of claim 5, wherein defining the criterion includes performing, by the gate application, a type check of a first parameter of the parameters and a first attribute of the attributes that are used in the Boolean expression to determine if the first parameter and the first attribute are of the same data type.

7. The method of claim 1 further comprising:
   causing the host application to disable the feature to a subset of users of the host application without recompiling the host application code, the subset of users associated with a first attribute of a first attribute value.

8. The method of claim 7, wherein causing the host application to disable the feature includes:
   updating the gate application to generate an updated gate application, the updating including changing at least one of a specified parameter of the parameters, a specified parameter value of the specified parameter or the criterion so that the first attribute value does not satisfy the updated gate application.

9. The method of claim 8, wherein the first attribute and the specified parameter are of the same data type.

10. The method of claim 7, wherein causing the host application to disable the feature includes:
    preventing the host application from executing the portion of the host application code corresponding to the feature for the subset of users.

11. The method of claim 1 further comprising:
    responsive to a determination that the attributes do not satisfy the criterion, preventing the host application from executing the portion of the host application code corresponding to the feature for the user.

12. The method of claim 1, wherein the parameters include a first parameter that is one of multiple data types defined by the gating application.

13. The method of claim 1, wherein receiving the request object from the host application includes:
    executing the host application at multiple computers in a distributed computing system,
    defining the criterion of the gate application at a first computer, and
    transmitting the gate application from the first computer to the computers for use by the host application.

14. The method of claim 1, wherein the host application code includes code for invoking the gate application and excludes code for the criterion.

15. A computer-readable storage medium storing computer-readable instructions, comprising:
    instructions for defining a gate application, at a server computer, that includes a plurality of gates that control availability of one or more features of a host application to a user of the host application, the host application executing at the server computer, the gate application including multiple parameters and a criterion defined based on the parameters, each of the parameters associated with a parameter value, wherein the gate application implements at least one of the plurality of gates to control the availability of a specified feature at runtime of the host application;
    instructions for receiving, by the gate application, a request from the host application to determine whether the specified feature is to be made available to the user, the request including a request object that has multiple attributes at least some of which are associated with the user, each of the attributes having an attribute value;
    instructions for determining, by the gate application, whether the attributes satisfy the criterion;
    instructions for, responsive to a determination that the attributes satisfy the criterion, causing execution, at the server computer, of a portion of host application code associated with the specified feature to make the feature available to the user on the server computer; and instructions for sending, from the server computer, a response to the user, the response indicating availability of the feature.

16. The computer-readable storage medium of claim 15 further comprising:
instructions for causing the host application to disable the feature to a subset of users of the host application without recompiling the host application code, the subset of users associated with a first attribute of a first attribute value.

17. The computer-readable storage medium of claim 16, wherein the instructions for causing the host application to disable the feature include:
instructions for updating the gate application to generate an updated gate application, the updating including changing at least one of a specified parameter of the parameters, a specified parameter value of the specified parameter or the criterion so that the first attribute value does not satisfy the updated criterion.

18. The computer-readable storage medium of claim 16, wherein the instructions for causing the host application to disable the feature include:
instructions for preventing the host application from executing the portion of the host application code corresponding to the feature for the subset of users.

19. The computer-readable storage medium of claim 15, wherein the instructions for defining the gate application include:
instructions for adding a specified parameter as one of the parameters to the gate application,
instructions for adding a specified parameter value to the specified parameter as the parameter value, and
instructions for defining the criterion as a Boolean expression using the parameters and the attributes.

20. A system, comprising:
a processor;
a first module configured to define a gate application, at a server computer, that includes a plurality of gates that control availability of one or more features of a host application to a user of the host application, the host application executing at the server computer the gate application including multiple parameters and a criterion defined based on the parameters, each of the parameters associated with a parameter value, wherein the gate application implements at least one of the plurality of gates to control the availability of a specified feature at runtime of the host application;
a second module configured to receive a request from the host application for determining whether to make the specified feature available to the user, the request including a request object having multiple attributes, each of the attributes having an attribute value, the request object received from a client device associated with the user;
a third module configured to determine, by the gate application, whether the attributes satisfy the criterion; and
a fourth module configured to transmit a result of the determination to the host application, which causes execution, at the server computer, of a portion of host application code associated with the specified feature to make the feature available to the user on the server computer in an event the result indicates that the attributes satisfy the criterion, wherein the fourth module is configured to transmit a response to the client device, the response indicating availability of the feature.

* * * * *